T. A. BEDARD.
RUNNER ATTACHMENT.
APPLICATION FILED JUNE 5, 1916.
1,217,136.
Patented Feb. 27, 1917.
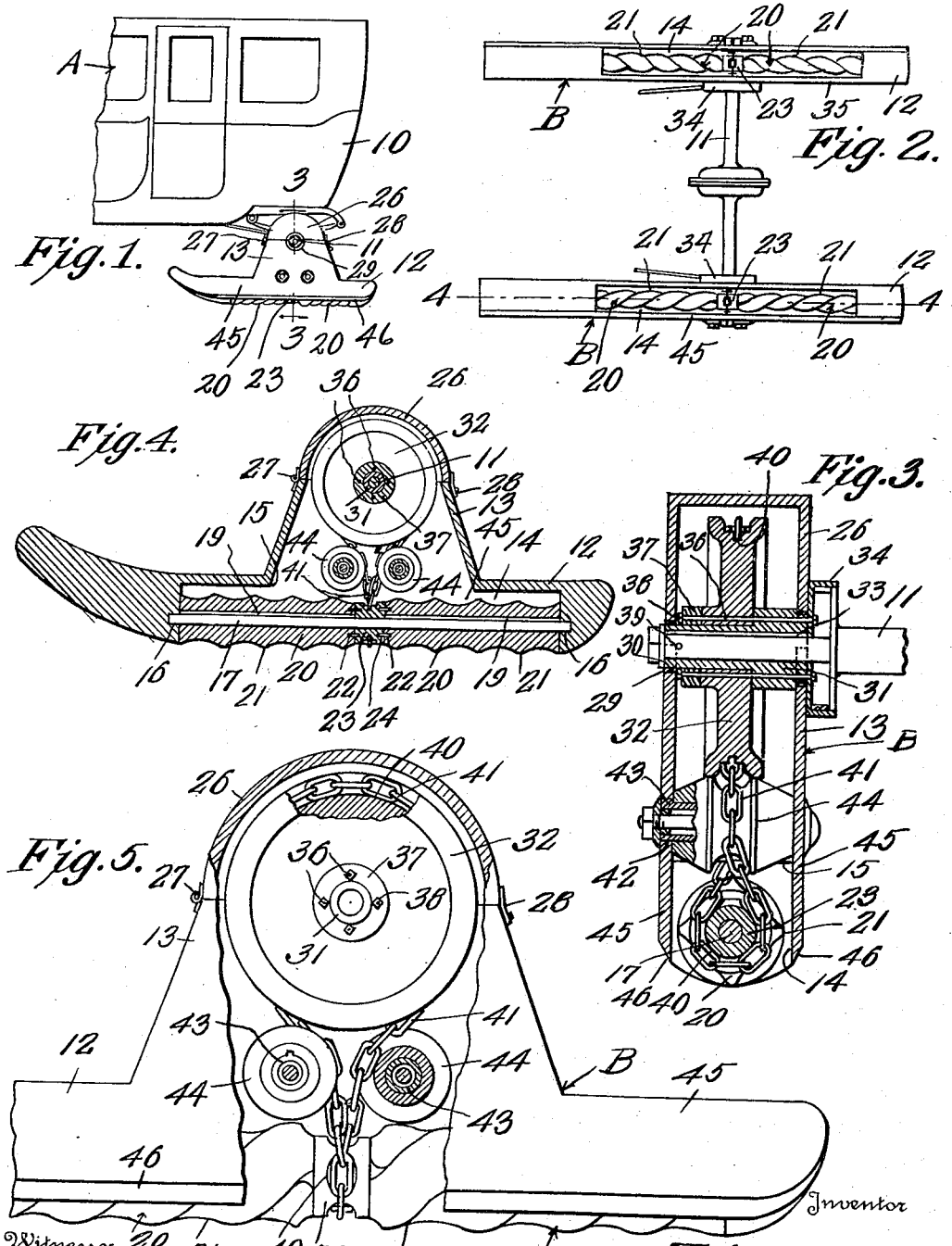

UNITED STATES PATENT OFFICE.

THOMAS A. BEDARD, OF ESCANABA, MICHIGAN.

RUNNER ATTACHMENT.

1,217,136.   Specification of Letters Patent.   Patented Feb. 27, 1917.

Application filed June 5, 1916. Serial No. 101,809.

*To all whom it may concern:*

Be it known that I, THOMAS A. BEDARD, a citizen of the United States, residing at Escanaba, in the county of Delta, State of Michigan, have invented certain new and useful Improvements in Runner Attachments; and I do hereby declare the following to be a full, clear, and exact description of the invention, such as will enable others skilled in the art to which it appertains to make and use the same.

This invention relates to runner attachments for motor propelled vehicles, and is directed more particularly to a runner adapted for application to the drive axle of an automobile and operable therefrom to propel the vehicle over snow or ice.

An object of the present invention resides in the provision of a runner of the character specified embodying means of novel combination and arrangement for its propulsion.

A further object of the invention is to provide a runner which may be quickly and conveniently applied to automobiles of ordinary construction without alteration thereof in any respect.

The invention further proposes a runner, the propelling means for which will receive its power from the drive axle of the automobile, and will be controlled by the usual transmission and brake mechanisms thereof.

With the above and other objects of similar nature in view, the invention consists in the construction, combination and arrangement of parts, set forth in and falling within the scope of the appended claims.

In the drawing:

Figure 1 is a side elevation of the rear portion of a motor vehicle with the invention associated therewith.

Fig. 2 is a bottom plan view thereof,

Fig. 3 is a transverse section taken on the line 3—3 of Fig. 1,

Fig. 4 is a longitudinal section through one of the runners, taken on the line 4—4 of Fig. 2, and Fig. 5 is a detail side elevation of one of the runners detached, parts thereof being broken away.

Referring now more particularly to the accompanying drawing, there is shown conventionally the rear portion of an automobile A including the body 10 and rear or drive axle 11. The invention is designated generally at B and comprises a runner 12 applied to the axle 11 at each end thereof in lieu of the drive wheels usually employed. These runners each consist of a metal casting constructed preferably in sections which may be bolted together or otherwise suitably connected so as to be readily disassembled should it be desired to replace or repair any part thereof or of the propelling mechanism to be subsequently described. Exteriorly the runner 12 presents the general appearance of a conventional sled runner, with the exception that upon its upper face is provided a box-like or housing structure 13 adapted to receive and support certain elements of the propelling mechanism as will later appear. Specifically the runner 12 is provided in its under face with a longitudinally extending channel 14 terminating short of its ends and communicating with the interior of the housing 13 through an opening 15 formed in the upper face of the runner. Provided in the end walls of the channel 14 are alined bearings 16 in which are journaled the ends of a shaft 17 lying within and extending throughout the length of the channel.

This shaft 17 is provided adjacent each end with a longitudinal key-way in which is inserted a key 19, while mounted and fixed by said keys against rotation on the shaft is a pair of propelling worms each including a roller 20, the outer periphery of which is provided with spiral flanges 21 projecting outwardly of the channel below the runner so as when rotated to sink or bite into the ice or snow and thus propel the runner forward or backward as the case may be.

The inner or adjacent ends of these rollers are spaced apart and are similarly provided with lugs 22, a pulley 23 being engaged loosely on the shaft between the rollers and provided with sockets 24 for receiving said lugs. Thus when power is applied to the pulley 23 it will be transmitted to the rollers through said lug and socket connection.

The top of the housing 13 is closed by a casing 26 hinged as at 27 thereto and held in closed position by means of a suitable fastener 28. This casing and the housing are provided with registering semicircular recesses suitably faced as at 29 and providing transversely alined bearings 30 in which is journaled a bushing 31, carrying thereon a drive wheel 32 housed within the boxing. This bushing 31 is longitudinally bored to receive the axle 11 of the machine and is keyed thereto as at 33. The bushing furthermore carries a brake drum 34 adapted for coöperation with the usual brake mechanism of the machine whereby the runner may be controlled in the same manner as if wheels were employed. In securing the drum 34, and likewise the drive wheel 32 to the bushing there are engaged therethrough and through the bushing, rods 36, which rods extend beyond the opposite side of the wheel from the drum and through a collar 37 engaged on the bushing, their terminals being threaded to receive tightening nuts 38 by which the above described parts are held in assembled position. A lock pin 39 is also engaged through the bushing and axle to further assist in securing the same in fixed relation one to the other.

The periphery of the drive wheel 32 and that of the pulley 23 are similarly provided with counter-sunk portions 40 for receiving the links of a drive chain 41 trained therearound, said wheel and pulley serving the purpose of sprockets whereby longitudinal slip of the chain will be prevented.

The housing 13 is further provided in its side faces between the drive wheel and pulley, with pairs of transversely alined openings 42 in which are fixed bushings 43 having journaled thereon guide rollers 44. These rollers are disposed adjacent to each other and have their peripheries grooved to receive and guide the chain 41 and prevent accidental disengagement thereof from the drive wheel and pulley.

Thus in operation, power is applied to the wheel 32 through the axle 11 and the parts operatively associated therewith, and is transmitted to the propelling rollers 20 by the drive chain 41, the machine being thereby caused to progress over the ground either forward or backward as desired and in a manner that is obvious.

It is of course understood that the speed with which the vehicle is operated is controlled by the usual transmission and brake mechanisms forming a component part thereof, application of the runners to the machine necessitating no alterations whatever either structural or mechanical.

It will further be noted that the side walls 45 of the channel 14 have their lower edges beveled inwardly and sharpened as at 46 whereby to enter the ice or snow to each side of the propelling worms and in this manner assist in preventing any tendency of sidewise skid of the runners during operation of the machine.

Such skidding of the machine is also prevented by rotating the rollers in one runner oppositely from those in the other runner, the spiral flanges thereof being oppositely pitched to drive the machine in a corresponding direction.

It is further understood that by increasing the pitch of the flanges 21, greater speed and less power is attained, while by decreasing the pitch thereof more power and less speed is attained.

What is claimed is:—

1. A runner attachment for motor propelled vehicles, comprising a body provided with a longitudinal channel, a propelling worm rotatably mounted in the channel and projecting therebelow, a sprocket on said worm, a housing supported upon the upper face of the body and communicating with the channel, a drive wheel journaled in the housing for application to the drive axle of the vehicle, guide rollers mounted in the housing between said wheel and sprocket, and a chain trained around said wheel and sprocket and directed between the rollers.

2. A runner attachment for motor propelled vehicles, comprising a body provided with a channel having alined bearings in its end walls, a shaft journaled in the bearings, spaced propelling worms keyed to the shaft and projecting beyond the channel, a sprocket loose on the shaft and interposed between said worms, locking means between the sprocket and said worms, and drive means associated with the sprocket to rotate the worms.

In testimony whereof, I affix my signature, in the presence of two witnesses.

THOMAS A. BEDARD.

Witnesses:
　Thos. Provost,
　Eddie Pecore.

Copies of this patent may be obtained for five cents each, by addressing the "Commissioner of Patents, Washington, D. C."